R. M. Wade,
Lubricator.
No. 12,803.　　　　　　Patented May 1, 1855.
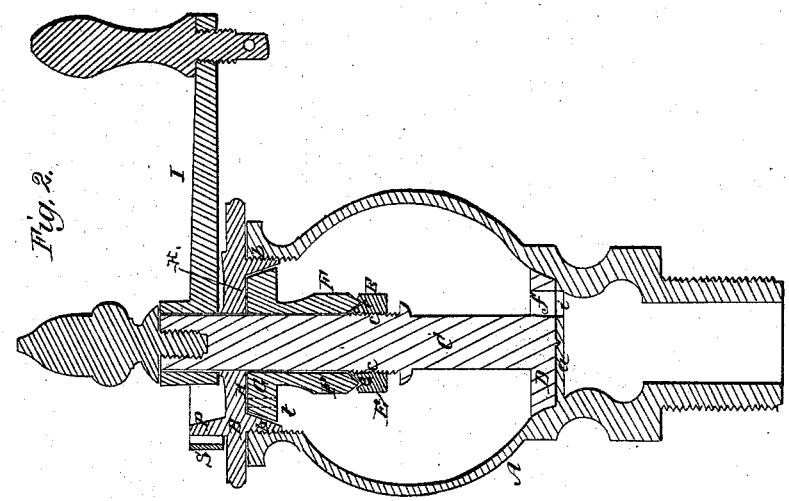
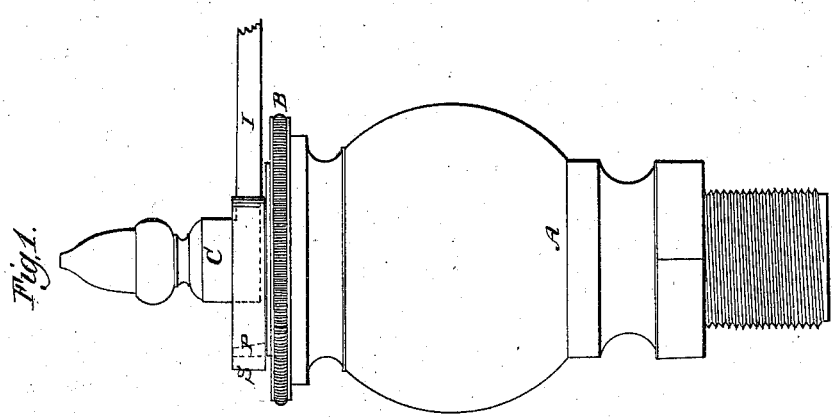
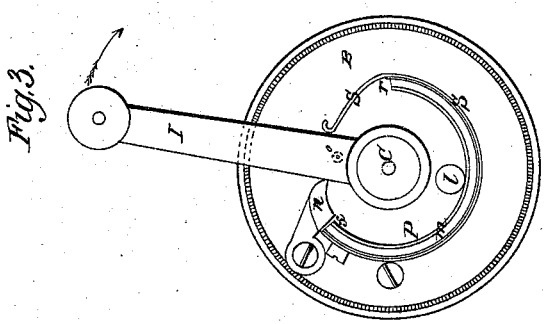

UNITED STATES PATENT OFFICE.

ROBERT M. WADE, OF WADESVILLE, VIRGINIA.

LUBRICATOR.

Specification of Letters Patent No. 12,803, dated May 1, 1855.

*To all whom it may concern:*

Be it known that I, ROBERT M. WADE, of Wadesville, in the county of Clark and State of Virginia, have invented a new and useful Improvement in Lubricators; and I do hereby declare that the following is a full, clear, and exact description of the same, reference being had to the annexed drawing, forming part of this specification, in which—

Figure 1 is an exterior view of the lubricator. Fig. 2 is a vertical section of the same, through its axis; showing the lubricator in position for discharging. Fig. 3 is a top view of the lubricator, when the discharge passage is closed.

Similar characters of reference in the several figures denote the same part of the lubricator.

The nature of my invention consists in constructing the oil reservoir with a perforated diaphragm in its lower part, and in combining said reservoir thus constructed with two disk valves, at opposite extremities of a central spindle, and connected with the spindle so as to be capable of adjustment in direction of its length; said valves being provided with perforations, the lower of which may be made coincident with the opening in the diaphragm, for letting oil to the cylinder, or the upper coincident with the feed opening in the top of the lubricator, by the turning of the spindle in opposite directions; the amplitude of said turning being governed and regulated by means of a sectional rim on the cover of the lubricator in a manner which will be fully set forth.

In the drawing A is the oil reservoir having a diaphragm $a$ in its lower portion, and covered by a top piece B, firmly attached to the body of the reservoir by a screw thread $b$. Passing through the cover B is the spindle C, having the disk valve D permanently attached to its lower extremity, and resting upon the flat upper surface of the diaphragm $a$; the beveled edge of the said valve fitting closely, but not so as to bind, in the bottom of the upper chamber of the reservoir. On the spindle is a screw thread $c$, on which fits a nut E, having a sharp groove $e$ in its upper edge, so as to form a steam tight joint between the nut and the lower edge of the socket F of the upper valve G. A portion of the shaft or spindle C over which the socket F passes is of square cross section, as is also the part of the socket fitting over it, for preventing the valve G from turning on the spindle. The effect of this construction, it will readily be seen, is by turning the nut E so that it rises on the spindle, to force the valve G into its seat H on the under side of the cover B; making the connection between the spindle, nut, and socket perfectly steam tight and causing the two valves D and G to fit closely in their seats.

In the lower valve D is an opening $f$ so arranged that it may be brought over a corresponding opening $i$ in the diaphragm $a$, and so let the oil to the cylinder. The upper valve G has also an opening which can be brought under the aperture $l$ in the cover B, under circumstances hereafter to be described.

At the upper extremity of the spindle C is the lever I for turning the said spindle, and on the outside of the cover B is a rim P composed of two parts one ($m$) fixed, and the other ($n$) attached by a screw pin so as to be swung back when occasion requires. This rim is inclosed by a spring S the loose end of which tends constantly to press the lever I against the end of the swinging section $n$ of the rim P. To the extremity of the lever I is attached a wire or cord leading to the engineer's stand, for operating the valve admitting oil to the cylinder. The arrangement of the several parts being such, that when the lever I is drawn by the engineer in the direction of arrow 1, until it stops against the end $r$ of the rim P, the opening $f$ in the lower valve will be directly over the opening $i$ in the diaphragm $a$; the several parts having the relative positions seen in Fig. 2, and the lubricator discharging into the cylinder, the upper opening at this time being closed by the valve G. When the lever I is released the spring S will carry it around to the position shown in Fig. 3, when by the arrangement of the parts both upper and lower openings are closed. When it is desired to feed the lubricator, the section $n$ of the rim P, is turned outward around its screw pin, permitting the spring S to carry the lever around, until it is brought up by the then extremity of the rim. In this position of the lever I, the opening $l$ in the cover B is coincident with the perforation of the valve G; the small air openings $o$ and $t$ being at the same time opposite each other. This permits the admission of oil to the reservoir, and when sufficient has entered, the section n is swung into place, and the lubricator is again ready for operation.

The advantages of this construction are as follows: The moving parts of the lubricator, being altogether within the oil reservoir, there is an absence of all joints leading to the outside, which by the action of the steam on entering the reservoir might be opened and an external leakage produced; neither can any wear of the moving parts produce that result. This is a great defect in most lubricators and is entirely obviated by the one described. The moving parts moreover can never become jammed by unequal wear, as the valves and their seats are by this construction flat surfaces, any wear on which is immediately corrected by the adjusting nut on the spindle. The sectional rim and parts connected therewith, in combination with the position of the apertures in the valves, permits the opening of feed and discharge at will, and makes the shutting of both, the natural position of the moving parts, a point though small, of great importance.

I make no claim to the shutting off of one passage of the lubricator when opening the other by arrangement of valve perforations as set forth. But What I do claim, is—

1. Constructing the moving parts of a central sectional spindle with disk valves at its extremities, susceptible of steam tight adjustment as described, and combining the same with the perforated diaphragm $a$ of the oil reservoir, for preventing external leakage and otherwise acting as set forth.

2. Also the sectional rim P and spring S, in combination with the arrangement of the valve apertures relative to the ends of said rim, so as to furnish three stopping points to the actuating lever, for feed, discharge, and the entire closing of the lubricator, when operating as set forth.

In testimony whereof, I have hereunto signed my name before two subscribing witnesses.

ROBT. M. WADE.

Witnesses:
GEO. PATTEN,
SAML. GRUBB.